United States Patent
Levine et al.

(10) Patent No.: US 12,505,444 B2
(45) Date of Patent: Dec. 23, 2025

(54) ARTIFICIAL INTELLIGENCE (AI) BASED TRANSACTION DATA PROCESSING AND RECONCILIATION

(71) Applicant: ACCENTURE GLOBAL SOLUTIONS LIMITED, Dublin (IE)

(72) Inventors: Aaron Levine, Encinitas, CA (US); Vijay Desai, San Diego, CA (US); Sumedha Ghosh, Chennai (IN); Arijit Paul, Hooghly (IN); Ravi Prakash, Raxaul (IN); Kapil Birla, Noida (IN)

(73) Assignee: ACCENTURE GLOBAL SOLUTIONS LIMITED, Dublin (IE)

(*) Notice: Subject to any disclaimer, the term of this patent is extended or adjusted under 35 U.S.C. 154(b) by 1015 days.

(21) Appl. No.: 17/556,746

(22) Filed: Dec. 20, 2021

(65) Prior Publication Data

US 2023/0196370 A1  Jun. 22, 2023

(51) Int. Cl.
| | |
|---|---|
| G06F 18/214 | (2023.01) |
| G06F 18/243 | (2023.01) |
| G06Q 20/38 | (2012.01) |
| G06Q 20/40 | (2012.01) |
| G06Q 40/02 | (2023.01) |

(52) U.S. Cl.
CPC ....... G06Q 20/4016 (2013.01); G06F 18/214 (2023.01); G06F 18/24323 (2023.01); G06Q 20/389 (2013.01); G06Q 20/407 (2013.01); G06Q 40/02 (2013.01)

(58) Field of Classification Search
CPC .......... G06Q 20/4016; G06F 18/24323; G06F 18/214; G06N 20/10
USPC ......................................................... 705/64
See application file for complete search history.

(56) References Cited

U.S. PATENT DOCUMENTS 8,386,381 B1 *  2/2013  Barton ................... G06Q 20/40
                                                           705/35
2021/0342847 A1 * 11/2021  Shachar ............. G06Q 20/4016

FOREIGN PATENT DOCUMENTS

| CN | 112016930 | * | 8/2020 |
| CN | 112016930 A1 | * | 8/2020 |
| CN | 112016930 A | | 12/2020 |

(Continued)

OTHER PUBLICATIONS

Intellectual Property India, "First Examination Report (FER) for Application No. 202214059234" dated Aug. 21, 2025, 5 pages.

Primary Examiner — John W Hayes
Assistant Examiner — Wodajo Getachew
(74) Attorney, Agent, or Firm — Mannava & Kang, P.C.

(57) ABSTRACT

An Artificial Intelligence (AI) based transaction data processing and reconciliation system analyzes transaction data of different accounts to determine anomalous transactions, tagged transactions with Required Adjustments tag (R-tag), or aging transactions. Different Artificial intelligence (AI) based models are trained to produce corresponding risk scores that enable the determinations. Those transactions having low-risk scores are automatically reconciled whereas transactions having higher risk scores can be flagged for further review. Furthermore, the accounts corresponding to the transactions are also analyzed via different AI-based account-level models to identify accounts that can be R-tagged and/or accounts that are at the risk of being de-certified. Those accounts with higher risk scores can be flagged for further review while accounts with lower risk scores can be automatically certified.

20 Claims, 12 Drawing Sheets

(56) References Cited

FOREIGN PATENT DOCUMENTS

| WO | WO-2020180241 A1 | * | 9/2020 | ........... G06Q 20/405 |
| WO | WO-2020248658 A1 | * | 12/2020 | ......... G06Q 20/4016 |

* cited by examiner

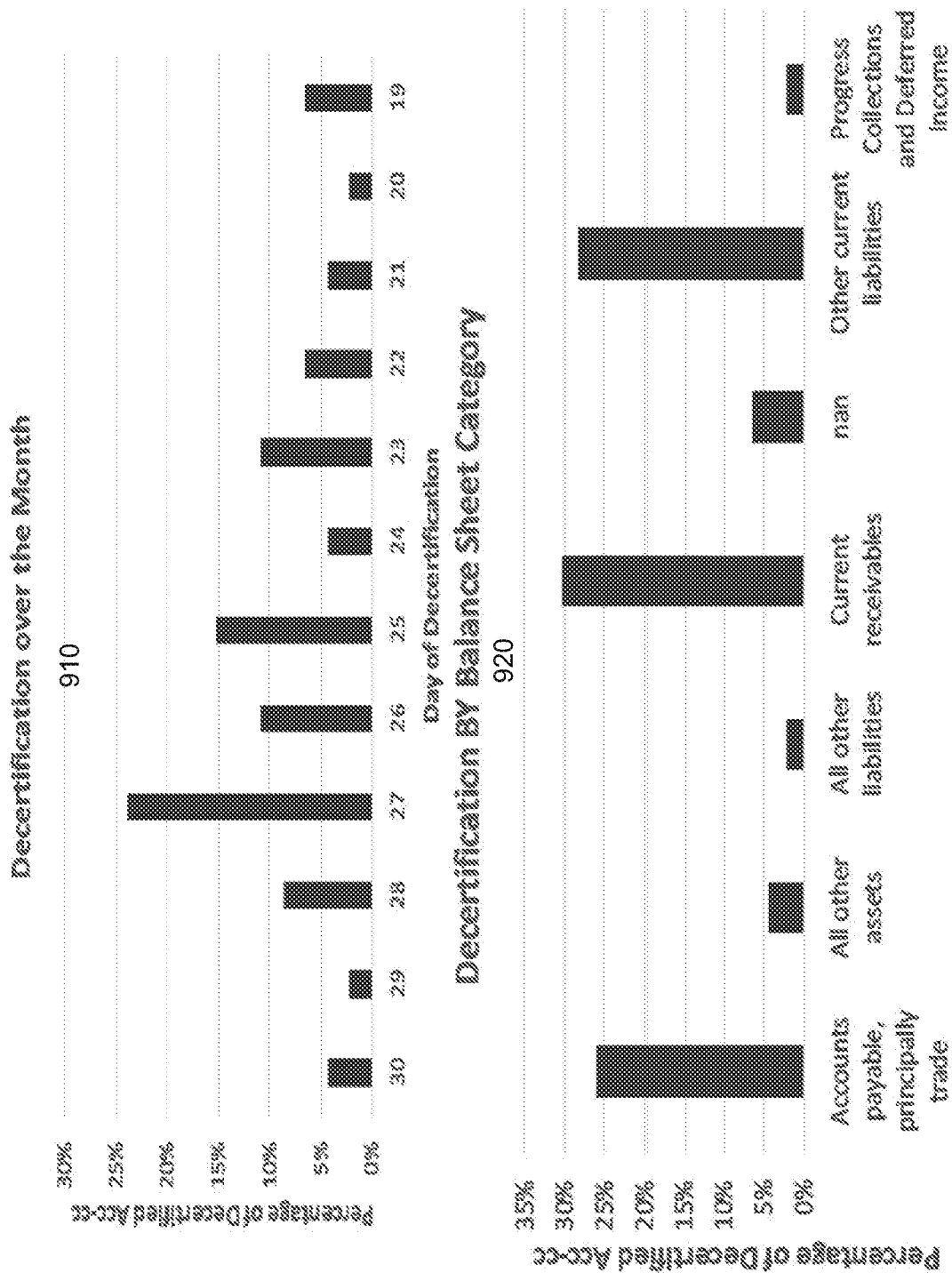
FIG. 9A Balance Sheet Category

ARTIFICIAL INTELLIGENCE (AI) BASED TRANSACTION DATA PROCESSING AND RECONCILIATION

BACKGROUND

Transaction reconciliation is the process of comparing transaction activity to supporting documentation with the view to resolve any discrepancies that may have been discovered. The reconciliation process ensures the accuracy and validity of transaction data. With the explosion of e-commerce where computers are used for various transactions such as financial transactions, massive amounts of data are being produced which necessitate accurate tracking and dynamic monitoring of transaction data. When combined with the regulatory regimes and pressure from competitors, greater efficiency is demanded from the transaction reconciliation systems.

BRIEF DESCRIPTION OF DRAWINGS

Features of the present disclosure are illustrated by way of examples shown in the following figures. In the following figures, like numerals indicate like elements, in which:

FIGS. 9A and 9B illustrate the applications of the AI-based transaction data processing and reconciliation system in the de-certifications of accounts in accordance with the examples disclosed herein.

DETAILED DESCRIPTION

Figure 1:
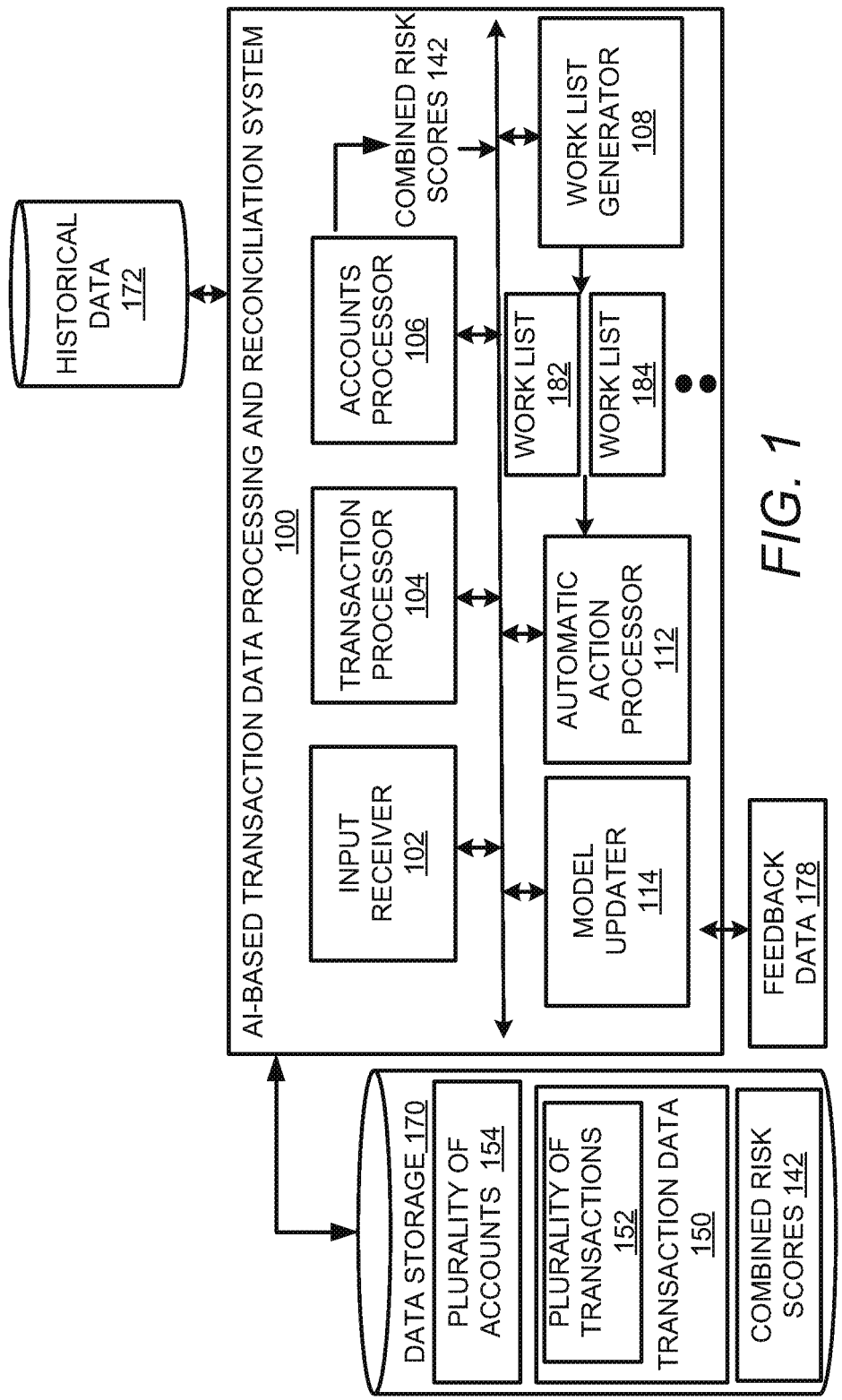
FIG. 1 shows a block diagram of an Artificial Intelligence (AI)-based transaction data processing and reconciliation system in accordance with the examples disclosed herein.

For simplicity and illustrative purposes, the present disclosure is described by referring to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

An AI-based transaction data processing and reconciliation system is disclosed. The AI-based transaction data processing and reconciliation system processes data of the transactions executed for different geographical regions and corresponding to one or more of a plurality of accounts, employs AI-based models to produce the risk scores for different elements that can cause the transactions to be tagged with different error tags or accounts to be de-certified and enables automatic reconciliation of transactions and/or automatic certification of accounts Transactions can include various financial interchanges corresponding to different geographic regions that can be classified under different items in a balance sheet for example, or accounts. The information regarding the transactions can be posted to different databases such as Enterprise Resource Planning (ERP) databases using the appropriate tools. The various elements of each transaction need to be reconciled periodically to ensure that the transactions have occurred correctly and completely.

The AI-based transaction data processing and reconciliation system employs various AI-based techniques to identify different errors in the transactions such as but not limited to anomalous transactions, transactions with Required Adjustments tag (R-tag), and/or aging transactions that are not resolved or reconciled for a longer time. In an example, a plurality of anomaly detection models are used to determine anomalous transactions from transaction data that is periodically generated. The plurality of anomaly detection models score transactions from the transaction data and transactions with higher scores can be automatically classified as anomalous transactions which are flagged for further review. A plurality of tag prediction models are used to score transactions to generate R-tag risk scores that predict the transactions that are likely to be associated with R-tags. Similarly, a plurality of aging prediction models (for different regions) are used to predict that transactions with a high risk of aging i.e., transactions that cannot be reconciled for longer periods. Features such as but not limited to, risk tables, amount anomalies, and transaction text, etc., can be extracted from the transaction data and provided to the plurality of tag prediction models and the plurality of aging prediction models for generating the risk scores. In an example, each tag prediction model can include a random forest ensemble of decision trees. Similarly, each of the plurality of aging prediction models can also include a random forest ensemble of decision trees. The anomalous transactions, R-tagged transactions, and aging transactions thus identified are flagged for review. In an example, the transactions can be manually reviewed. The feedback from the reviews can be stored and used to further train the various AI models. In an example, the feedback can include changes to actions executed during the automatic reconciliation of the transactions.

As each of the transactions is associated with a specific account, reconciliation of the transactions enables certification of the accounts. An account that is certified can indicate that all the transactions associated with that account are reconciled. Accounts with a greater number of anomalous, R-tagged, or aging transactions may be de-certified or flagged for further review which can waste time and resources. In order to avoid such wastage, AI models can also be employed at the account level for account certification. For example, a plurality of account models can be used to identify accounts with higher risks of being R-tagged or likely to be de-certified. In an example, an account risk score can be computed for each account based on the corresponding R-tag risk score and the de-certification risk score of the account. Furthermore, a combined risk score is generated for each account of the plurality of accounts by the corresponding plurality of account models based on the account risk scores and risk scores of the transactions associated with the account. A work list corresponding to a geographic region is generated that includes the accounts referred to in the transaction data arranged in ranked order, e.g., descending order of combined risk scores. For each account in the work list, the transactions in that account are also arranged in descending order of risk scores. The high-risk or risky accounts can be flagged for further review while accounts with lower risk can be recommended for automatic certification. In an example, the determinations regarding further review or automatic reconciliations and automatic certifications can be output by the AI models based on the training. Again, the data regarding the certification of accounts that were flagged for review can be used to train the plurality of account models.

When reconciling transactions associated with an account, any open transactions which were not reconciled/resolved due to mere formality but which have supporting documentation can be flagged as a List item (i.e., L-tag). On the other hand, if an open transaction is associated with an incorrect balance, or an unreconciled difference between a transaction amount and the account balance, then that transaction is flagged with a Required Adjustments tag (R-tag). As such open transactions age, they can cause greater problems. L-tag transactions may be escalated as R-tag transactions while R-tag transactions are escalated into higher seniority levels as they age taking up valuable time for resolution/reconciliation. Therefore, speedy and prompt recognition and reconciliation of transactions are required in the transaction reconciliation systems. Furthermore, an account that may be a collection of transactions associated therewith is reconciled based on the reconciliation of the associated transactions. Accounts can be classified into various levels of risk. Static rules related to account balances and the presence of difficult-to-reconcile transactions (e.g., R-tag transactions) are applied at the reconciliation period to determine whether an account should be manually reconciled or if the account can be auto certified. Account decertifications can result if the transactions in the account are reconciled incorrectly. Also, the static rules used for account certifications do not take into consideration the transaction level risks. Therefore, if a transaction is at risk of being an anomalous transaction, or a transaction is at risk of being an R-tagged item or is at the risk of aging, such risk probabilities are not considered at the time of reconciling the account.

The AI-based transaction data processing and reconciliation system in accordance with the examples described herein enables to dynamically determine account risk and transaction risks using AI models. Additionally, the transactions can be scored daily so that higher-risk transactions can be examined as soon as they arrive instead of waiting for the reconciliation period to begin. A work list identifies the riskiest accounts in the current reconciliation period for a given geographic region which in turn include the riskiest transactions by rank ordering the accounts and the transactions therein. Based on the work list, recommendations can be made or automatic actions can be executed for lower-risk transactions and accounts that are due for manual reconciliation and higher-risk transactions/accounts that are due for automatic reconciliation or automatic certification. As a result, the transaction and account data reconciliation and certification processes are made more efficient since higher-risk transactions are reviewed at the outset. The reconciliation and certification processes are also quicker since the AI data reconciliation system removes the dependency of these processes on static rules and instead a dynamic assessment of the transactions and accounts is conducted by the different AI models described herein via early detection of anomalous or aging transactions or accounts that are likely to be de-certified.

FIG. 1 shows a block diagram of an AI-based transaction data processing and reconciliation system 100 in accordance with the examples disclosed herein. The AI-based transaction data processing and reconciliation system 100 accesses transaction data 150 regarding a plurality of transactions 152 associated with a plurality of accounts 154, identifies anomalous transactions based on anomaly scores are generated for the plurality of transactions and determines one or more R-tagged and aging transactions based on transaction risk scores generated from the transaction data 150. Transactions having higher risk can be examined or reviewed as soon as they are received. Furthermore, based on the anomalous, R-tagged, and aging transactions included in each account of the plurality of accounts 154, the account can also be scored periodically e.g., weekly, monthly, etc. Transactions with a lower number of anomalous and/or R-tagged/aging accounts can be automatically reconciled whereas accounts with higher risk scores with a higher number of anomalous and/or R-tagged/aging accounts can be classified for further review and/or manual reconciliation. In an example, the AI-based transaction data processing and reconciliation system 100 can be communicatively coupled to a data storage 170 to store various pieces of data such as, transaction data 150, the plurality of transactions 152, the plurality of accounts 154, different transaction scores, and account scores that are needed to execute different functions of the AI-based transaction data processing and reconciliation system 100.

The AI-based transaction data processing and reconciliation system 100 includes a data receiver 102, a transaction processor 104, an accounts processor 106, a work list generator 108, and an automatic action processor 112, and a model updater 114. The data receiver 102 receives the transaction data 150 including the plurality of transactions 152 that occur within a predetermined time period, e.g., a transaction reconciliation period. For example, the transaction reconciliation can occur daily while account reconciliation/certification can occur weekly, monthly, etc. The transaction data 150 thus collected is provided to the transaction processor 104. In an example, the data receiver 102 can access journals posted in the Enterprise Resource Planning (ERP) Data via Secure File Transfer Protocol (SFTP). The transaction processor 104 periodically scores each of the transactions received in the transaction data 150 to determine if the transaction is anomalous or if the transaction is likely to be associated with an R-tag or the transaction is aging for example, for more than 120 days. Unusual transactions or transactions that are atypical for a given account can be identified as anomalous transactions e.g., transactions that deviate from standard postings in the ERP databases such as transactions with anomalously high values, transactions with text that does not match the category, etc. In an example, the transaction processor 104 can score the transactions in the transaction data 150 periodically, e.g., daily. The transaction processor 104 can include AI models which are trained as detailed herein for scoring the transactions. Different models implementing different AI techniques can be used for the identification of anomalous transactions and the prediction of L-tag and R-tag transactions. In an example, the feedback data 178 can be received from the various transaction reconciliations and used for training the AI models via supervised or unsupervised techniques. The AI models can implement pattern detection for scoring the plurality of transactions 152 based on historical data 172.

The transactions scores by the different AI models in the transaction processor 104 can be accessed by the accounts processor 106. The accounts processor 106 is configured to score all transactions from a current reconciliation period, e.g., the current month, with AI models updated with feedback from the last reconciliation period e.g., the previous month. Combined risk scores 142 are generated from the scoring for each account of the plurality of accounts 154 based on the anomaly scores and transaction risk scores. The plurality of accounts 154 may be scored periodically e.g., monthly. The accounts processor 106 can also implement AI-based techniques to predict the risk for R-tags and decertifications using the occurrences of R-tags and decertifications in the historical data 172 at the account level. The account-level AI-based models of the accounts processor 106 can also examine the historical unidentified balances which are the amounts that have not been successfully reconciled and are indicative of the presence of open items or R-items. The combined risk scores 142 of each account enable a determination regarding whether the account can be auto certified or if the account needs to be reconciled via other methods e.g., manual reconciliation.

The combined risk scores 142 for the plurality of accounts 154 are accessed by the work list generator 108. The work list generator 108 can be configured to create a plurality of work lists 182, 184, etc., for different geographic regions that identify accounts from the plurality of accounts 154 which are to be manually reconciled. While some of the accounts may be assigned for manual reconciliation, other accounts may be initially auto certified depending on the account risk scores. However, the work list generator 108 can access the latest account risk scores in each reconciliation period to make the determinations regarding the auto certifications and manual reconciliations for that period. This can occur due to the updates to the transaction and account scoring AI models and feature values obtained from the feedback data 178. A work list 182 thus generated prioritizes accounts and within each account prioritizes the transactions associated with a specific geographic region as per the transaction risk scores.

Each of the work lists 182, 184, . . . , is provided to an automatic action processor 112 which enables execution of automatic actions. The automatic actions can involve automatic certifications of the accounts and automatic reconciliations of transactions within the accounts. The automatic actions are executed based on the positions of the accounts and transactions within the accounts in the work lists, 182, 184, . . . . Accounts with high priorities (i.e., higher risk scores) are sent to reviewers for manual certification. Furthermore, the high-risk transactions within each account in the work list 182 are flagged for manual reconciliation. The low-risk accounts are auto certified while the low-risk transactions in each account can be reconciled automatically. In an example, all transactions in the high-risk accounts can be flagged for manual reconciliation.

The output of the AI-based transaction data processing and reconciliation system 100 includes not only automatic actions such as auto certifications and/or automatic transaction reconciliations but also flagging high-risk accounts and high-risk transactions. The manual certifications and manual transaction reconciliation data of the high-risk accounts and the high-risk transactions can be received by the AI-based transaction data processing and reconciliation system 100 as feedback data 178. The feedback data 178 is employed by the model updater 114 for updating the AI models employed by the transaction processor 104 and the accounts processor 106. More specifically, feedback regarding transactions associated with a specific geographic region can be used to train the AI models of that specific geographic region. As the reconciliation periods and the certification periods corresponding to the transaction processor 104 and the accounts processor 106 are different, the periodicity of the AI model updates also differs. For example, the transaction reconciliation can occur daily, and hence the models for the transaction processor 104 can be updated daily whereas the account certification by the accounts processor 106 may happen less frequently and accordingly, the feedback data for the account certification and hence the model updates for the accounts processor 106 also occur less frequently.

Figure 2:
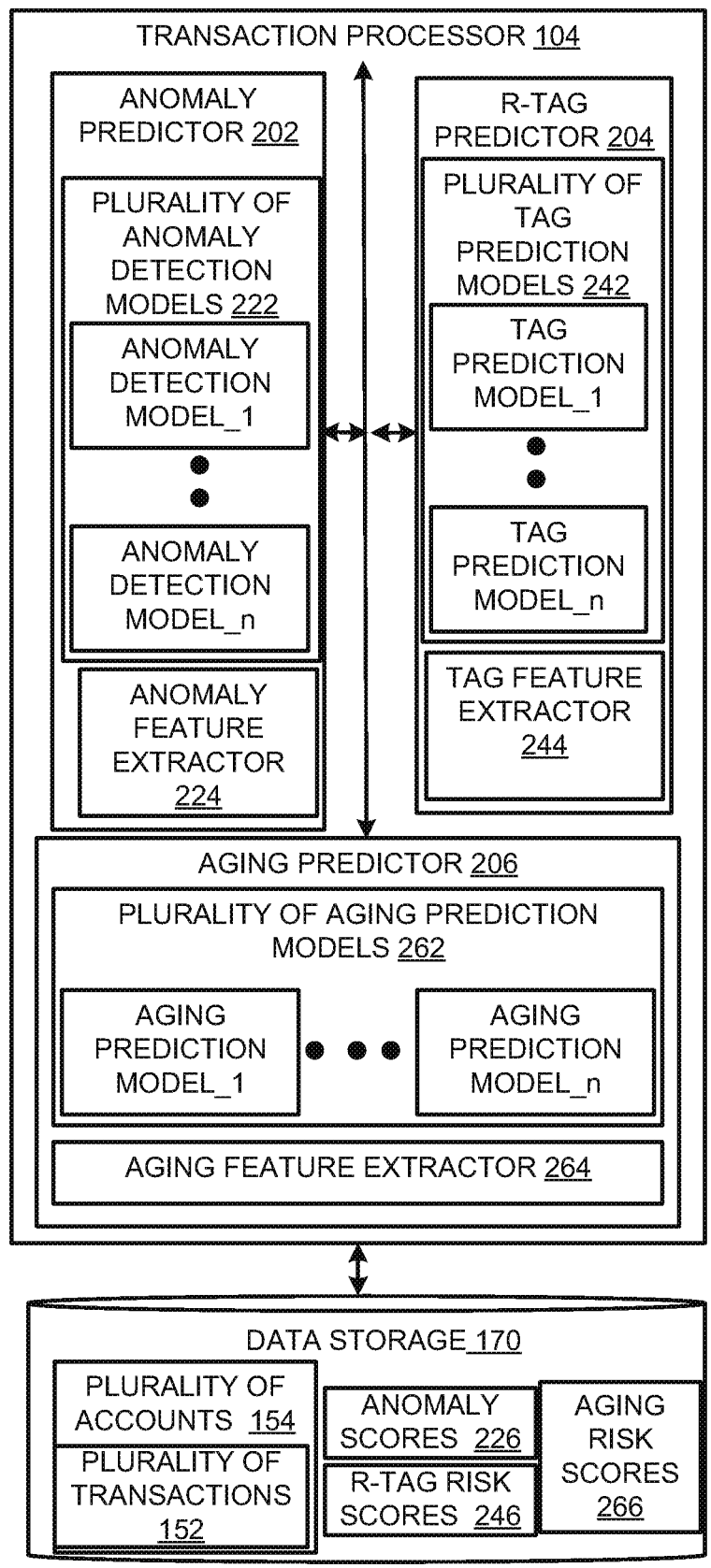
FIG. 2 shows a block diagram of a transaction processor in accordance with the examples disclosed herein.

FIG. 2 shows a block diagram of the transaction processor 104 in accordance with the examples disclosed herein. The transaction processor 104 includes an anomaly predictor 202, an R-tag predictor 204, and an aging predictor 206. Each of the anomaly predictor 202, the R-tag predictor 204, and the aging predictor 206 includes models trained for different geographical regions. For example, the anomaly predictor 202 can include a plurality of anomaly detection models 220 such as anomaly detection model_1, anomaly detection model_2, . . . anomaly detection model_n, trained to identify anomalies in transactions arising from different geographical regions. As mentioned herein, each of the plurality of transactions 152 is associated with a corresponding account of the plurality of accounts 154, and therefore, each transaction can be associated with the amounts, users, currency profiles, and text profiles that characterize each of the plurality of accounts 154. In an example, each of the anomaly detection models 220 can be an unsupervised model trained on features including but not limited to transaction amount profiles, transaction user profiles, transaction currency profiles, and transaction text profiles. The anomaly predictor 202 includes an anomaly feature extractor 224 that extracts feature values from the transaction data 150 for the calculation of the anomaly scores 226 for each of the transactions in the transaction data 150. A cluster-based local outlier factor model can be used to identify transactions having atypical values and the reasons or multiple reasons for these atypical values can be provided. For example, a transaction might have an amount much higher than the values received for the last 90 days, or it might have a currency that was not seen in the transactions for that account. Such values can be flagged as anomalies. Therefore, the anomaly detection models 220 are trained to flag as anomalies, transaction amounts, transaction users, transaction currencies, and transaction text that deviate sufficiently from corresponding account level profiles. Furthermore, a transaction can be flagged if its text is a better match for a different account category and document type. Again, as the feedback data 178 is received for the output generated by the AI-based transaction data processing and reconciliation system 100, the anomaly detection models 220 are updated periodically.

The R-tag predictor 204 includes a plurality of tag prediction models 242 (e.g., tag prediction model_1, tag prediction model_2, . . . tag prediction model_n), trained to predict or output a likelihood that a given transaction can be associated with an R-tag. Each of the plurality of tag prediction models 242 can be trained via supervised methods on labeled training data including prior examples of R-tagged transactions associated with a specific geographical region for predicting the R-tagged transactions for that specific geographic region in the transaction data 150. In an example, each of the plurality of tag prediction models 242 can include a random forest ensemble of decision trees. The features used for the R-tag predictions can include but are not limited to risk tables, amount anomalies, text models, etc. The R-tag predictor 204 includes an R-tag feature extractor 244 for extracting features from the transaction data 150 for the calculation of the R-tag risk scores 246 for each of the transactions in the transaction data 150.

The aging predictor 206 also includes a plurality of aging prediction models 262 (e.g., aging prediction model_1, aging prediction model_2, . . . aging prediction model_n), wherein n is any natural number that may equal the number of geographical locations/regions from which the transactions in the transaction data 150 are received. The plurality of aging prediction models 262 are trained to generate aging scores that indicate the likelihood that a transaction can age for a predetermined period e.g., more than 120 days. As mentioned above with respect to the plurality of tag prediction models 242, each of the plurality of aging prediction models 262 are also trained to output aging predictions for transactions associated with a specific geographic location. The features such as but not limited to risk table features, amount anomalies and textual features of the transactions can be used by the plurality of aging prediction models 262 to produce the aging predictions. Additionally, supervised training techniques can be used to train the plurality of aging prediction models 262. In an example, each of the plurality of aging prediction models 262 can include a random forest ensemble of decision trees. The aging predictor 206 includes an aging feature extractor 264 for extracting feature values from the transaction data 150 for calculating the aging risk scores 266 for each of the transactions in the transaction data 150 by the corresponding one of the plurality of aging prediction models 262. In an example, the risk scores from the R-tag predictor 204 and the aging predictor 206 can be combined or aggregated to define a single risk score at the transaction level. In an example, the R-tag risk score can be combined with the account risk score to determine if the account is to be included in a corresponding work list.

Figure 3:
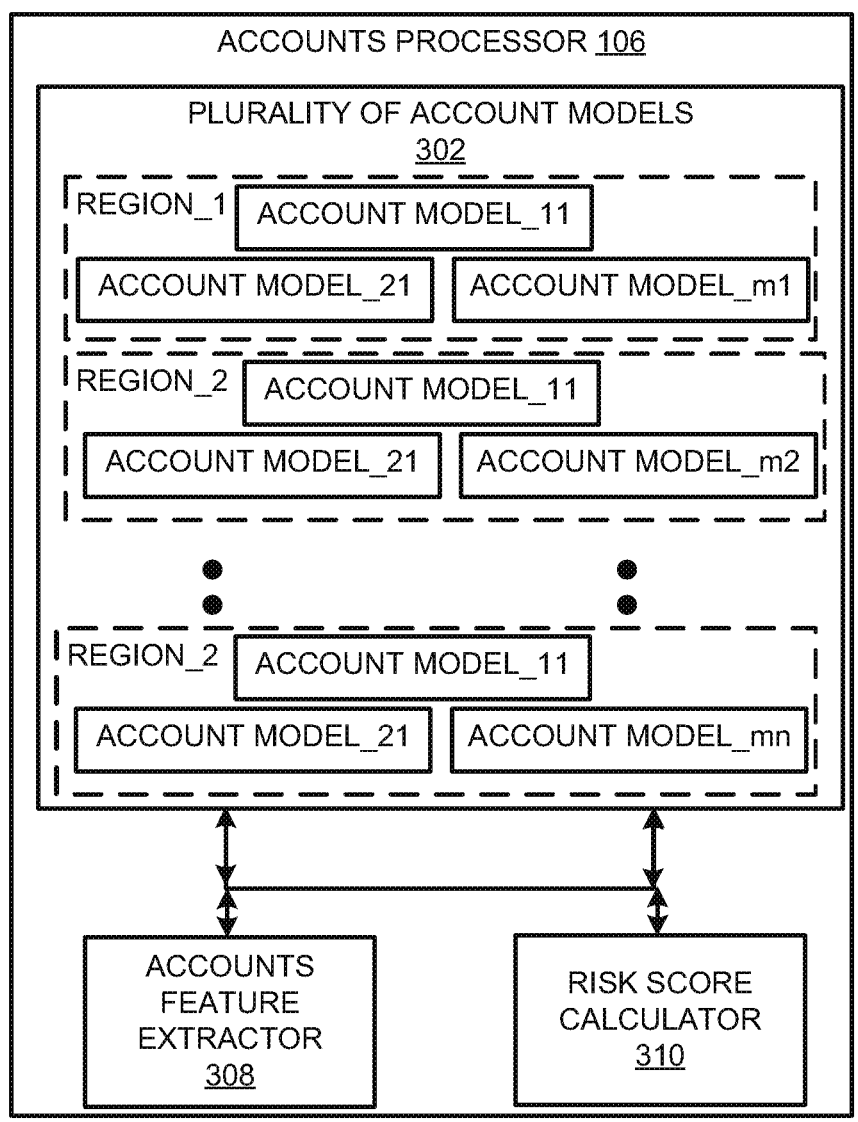
FIG. 3 shows a block diagram of an accounts processor in accordance with the examples disclosed herein.

FIG. 3 shows a block diagram of the accounts processor 106 in accordance with the examples disclosed herein. The accounts processor 106 also includes a plurality of account models 302 which are configured to identify accounts that are at the risk of being tagged or de-certified, pertaining to different regions and different account types, an accounts feature extractor 308, and a risk score calculator 310. For example, a plurality of account models, i.e., account model_11, account model_21, . . . account model m1 can be used to analyze data of the transactions of Region_1 and corresponding different account types, e.g., account type_1, account type_2, . . . account type_m wherein m is a natural number and m is the number of account types configured within the accounts processor 106. Similarly, account-level models can be trained to identify the R-tags and de-certifications, for each of the n regions wherein n is a natural number and n is equal to the number of regions from which the transaction data 150 is collected. The accounts feature extractor 308 is included in the accounts processor 106 for extracting feature values from the transaction data 150 and/or the historical data 172 for the calculation of the combined risk scores 142.

The plurality of account models 302 are trained via supervised techniques on the historical data 172 to generate R-tag scores and de-certification scores which are indicative of the likelihood of the plurality of accounts 154 being R-tagged or decertified. The historical data 172 can include prior R-Tag accounts, de-certified accounts reconciliation history, and account balance anomalies such as positive balances in liability accounts or negative balances in asset accounts. If it is determined that the accounts can be associated with R-tags by one or more of the plurality of account models 302, then such determinations can be indicative of the presence of open items or R-tagged transactions in the corresponding accounts. Furthermore, determinations regarding larger changes in month-by-month transaction counts and transaction amounts are also correlated with the presence of R-tags or open items. The accounts processor 106 is, therefore, configured to capture the most R-tagged transactions in the top decile of the predictions. For each of the plurality of accounts 154, a combined risk score is generated by the risk score calculator 310 combining the account level risk score with the risk scores of each of the transactions associated with that account. More particularly, each of the combined risk scores 142 quantifies the total transaction level risk by combining the transaction level risk scores and the currency amounts (converted to a common currency if amounts are in different currencies) and weighted by the account risk score.

Figure 4:
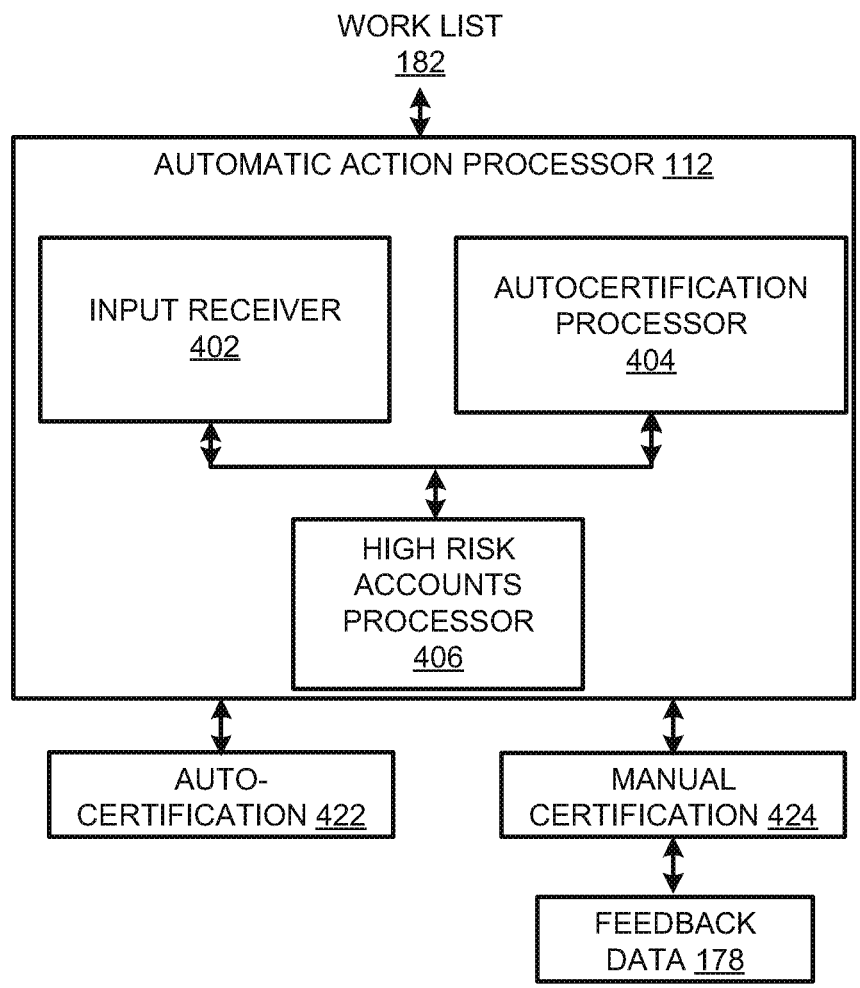
FIG. 4 shows a block diagram of an automatic action processor in accordance with the examples disclosed herein.

FIG. 4 shows a block diagram of the automatic action processor 112 in accordance with the examples disclosed herein. The automatic action processor 112 includes input receiver 402, an auto certification processor 404, and a high-risk account processor 406. One of the work lists, e.g., the work list 182 including a rank ordering of the accounts from the highest to the lowest of the combined risk scores 142 is received by the input receiver 402. The auto certification processor 404 identifies a predetermined number or a predetermined percentage of the lowest-ranked accounts for automatic certification 422 which would include low-risk accounts. The remaining accounts in the work list 182 are processed by the high-risk account processor 406 for manual reconciliation/certification 424. In an example, the manual certification data can be provided to the AI-based transaction data processing and reconciliation system 100 as feedback data 178 to be used in the supervised training of the models used by the transaction processor 104 and the accounts processor 106.

Figure 5:
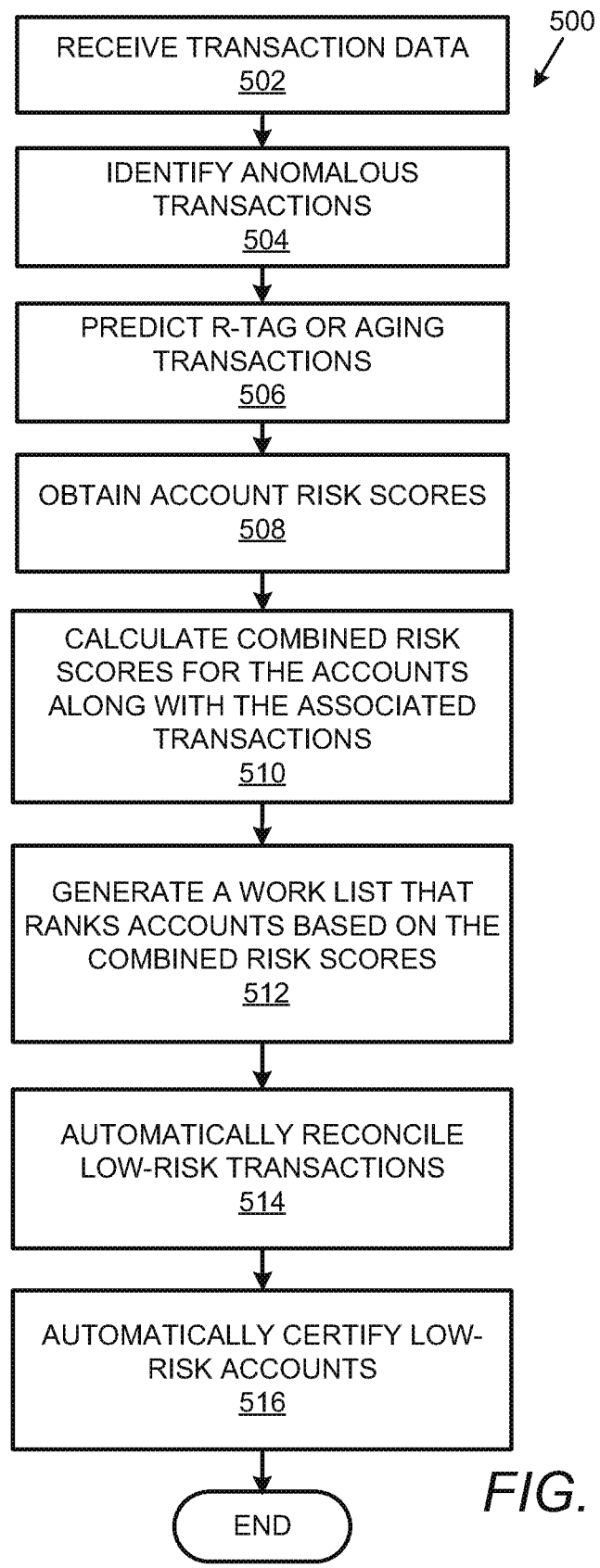
FIG. 5 shows a flowchart that details a method of AI-based transaction data reconciliation in accordance with the examples disclosed herein.

FIG. 5 shows a flowchart 500 that details a method of AI-based transaction data reconciliation in accordance with the examples disclosed herein. The method begins at 502 wherein the transaction data 150 is received. In an example, the transaction data 150 can include the plurality of transactions 152 such as new transactions that are ingested daily. Each of the plurality of transactions 152 can be associated with one of a plurality of accounts 154. In an example, the plurality of accounts 154 can form an item in a financial statement such as but not limited to, accounts payable, current receivables, etc. At 504, the anomalous transactions are identified in the transactions associated with the transaction data 150. In an example, a plurality of anomaly detection models 222, wherein each anomaly detection model is trained to identify anomalies from the transactions or atypical transactions originating from a particular geographical region can be used for identifying the anomalous transactions. At 506, the R-tag and/or aging transactions are identified using a plurality of tag prediction models 242 and the plurality of aging prediction models 262. In an example, the transactions are scored daily by the various AI-based models i.e., the anomaly detection models 222, the tag prediction models 242, and the plurality of aging prediction models 262.

At 508, account risk scores are obtained using the account-level, region-based AI models, which include the plurality of account models 302. In an example, the plurality of accounts 154 may be scored less frequently e.g., weekly, fortnightly, or monthly, than the transactions. At 510, the combined risk scores 142 are obtained from the transaction risk scores and the account risk scores. In generating the combined risk score for an account, if two transactions have the same risk score at both transaction and account level, the one with the higher transaction amount will be weighted higher than the other transaction with the same risk score but a lower amount. For each account, the value at risk or the combined risk score can be obtained as a product of log of the absolute transaction amount with transaction score and account score for each transaction, and summing the products for all transactions in the transaction data of different regions as shown below:

$$\sum_{i=1}^{n} \text{Log(absolute(transaction\_amount}_i)+1)*(\text{transaction\_score}_i)*(\text{account\_score})$$

where n is the total number of transactions in that account,
transaction_amount$_i$ is the amount associated with transaction i, and
transaction_score$_i$ is the score associated with transaction i, and
Account_score is the account risk score generated by the corresponding account model of the plurality of account models 302 which signifies a combined risk of the account for R-tags and decertification.

The work list 182 is generated at 512 by ordering the plurality of accounts in descending order of the combined risk scores 142. The work list 182 includes higher risk accounts that are to be manually certified at the top while the lower risk accounts that can be auto-certified are at the bottom of the work list 182. Within each account included in the work list 182, the transactions are also arranged in descending order of risk scores. In an example, trained classifiers can be used to select a subset of low-risk transactions from each account for automatic reconciliation at 514. Similarly, trained classifiers can be used to select a subset of low-risk accounts with risk scores below certain predetermined levels for each of the plurality of accounts 154 for auto certification at 516.

Of course, it can be appreciated that since accounts are not scored as frequently as transactions, the steps of obtaining account risk scores, generating a combined risk score, and auto certification of accounts need not occur as frequently as transaction scoring and transaction reconciliation. Furthermore, the status of accounts can change between different reconciliation periods. For example, an account that has high combined risk scores in the prior reconciliation period and was flagged for manual certification may qualify for automatic certification in the current reconciliation period due to a lowered combined risk score. Conversely, an account that was automatically certified in the prior reconciliation period may be flagged for manual reconciliation/certification in the current reconciliation period. Thus, the AI-based transaction data processing and reconciliation system 100 enables updating the statuses of the plurality of accounts 154 for each reconciliation period thereby improving the efficiency of transaction reconciliation processes.

Figure 6:
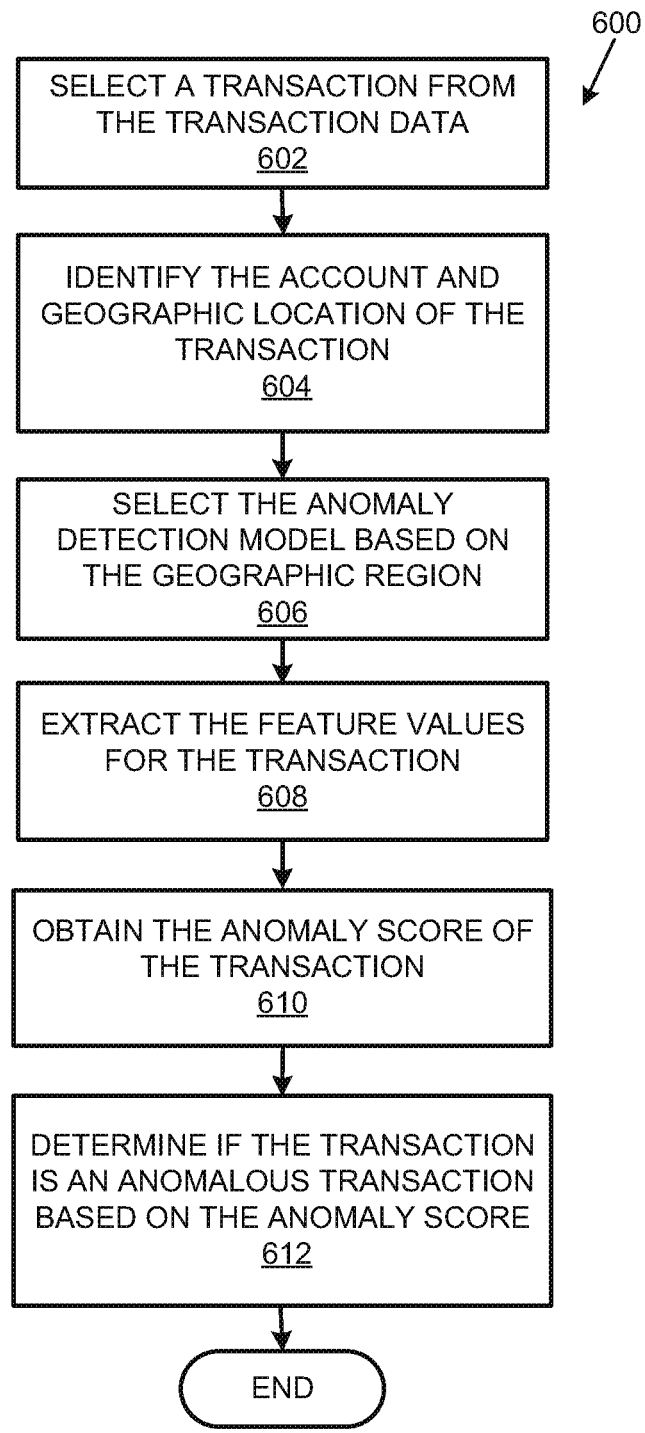
FIG. 6 shows a flowchart for a method of identifying anomalous transactions in accordance with the examples disclosed herein.

FIG. 6 shows a flowchart 600 for a method of identifying anomalous transactions in accordance with the examples disclosed herein. The method begins at 602, wherein a transaction is selected from the transaction data. At 604, the account and the geographic location associated with the transaction are identified. At 606, the anomaly detection model pertaining to the geographic location is selected from the plurality of anomaly detection models 222. The feature values for the transaction to be used by the anomaly detection model are extracted at 608 from one or more of the transaction data 150, the historical data 172, and the data storage 170. The extracted feature values can include the transaction amount, the user associated with the transaction, the currency of the transaction, and the transaction text. The anomaly score for the transaction is output at 610. At 612, the anomaly score is used to determine if the transaction is anomalous. In an example, a cluster-based local outlier factor model can be used to identify transactions with atypical values. Additionally, the reason or reasons for such atypical values are also provided. Similarly, other transactions may also be processed to determine if the transaction is anomalous i.e., includes atypical values for a given account and a given region. Higher anomalous transactions in an account may cause an increase in the combined risk scores thereby classifying the account for manual certification.

Figure 7A:
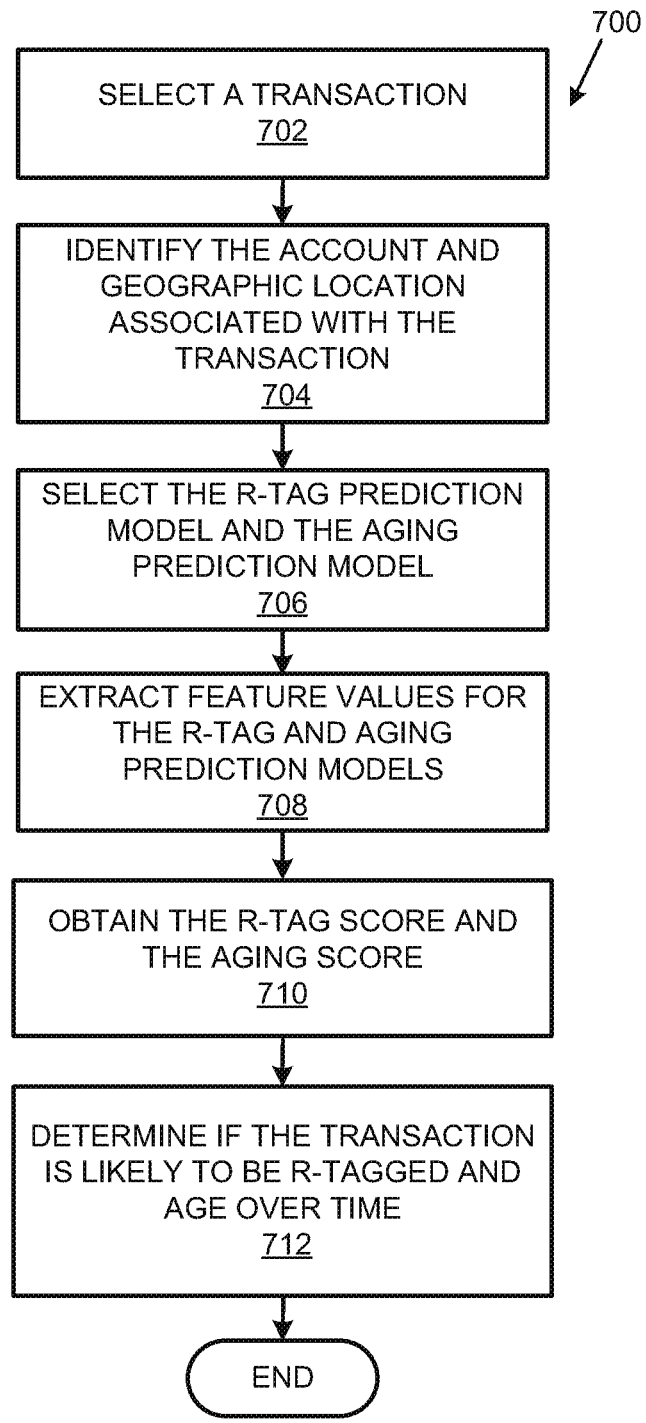
FIG. 7A shows a flowchart for a method of predicting R-tagged or aging transactions in accordance with some examples disclosed herein.

FIG. 7A shows a flowchart for a method of predicting transactions that can be R-tagged or aging transactions in accordance with some examples disclosed herein. The method begins at 702, wherein a transaction is selected from the transaction data 150. At 704, the account and the geographic location associated with the transaction are identified. At 706, the R-tag model and the aging prediction model pertaining to the geographic location are selected respectively from the plurality of tag prediction models 242 and the plurality of aging prediction models 262. The feature values for the transaction to be used by the Tag prediction model and the aging prediction model are extracted at 708 from one or more of the transaction data 150, the historical data 172, and the data storage 170. The extracted feature values can include but are not limited to, risk tables, amount anomalies, and text models. Within the risk tables, the features can include entities such as the account+company code associated with the transaction, document type, the balance sheet category, and the account group. Further risk table features can include but are not limited to, the percent of transactions that become open or are not reconciled, percent of transactions that become open or are not reconciled due to R-tags, percentage of transactions with amounts>0, percentage of transactions with non-null text, percentage of transactions that age beyond 120 days, average transaction magnitude and standard deviation of transaction magnitude can be applied to identify R-tag/aged transactions from the feature values.

Additionally, metrics including but not limited to, the percent of transactions that become open or are not reconciled, percent of transactions that become open or are not reconciled due to R-tags, percentage of transactions with amounts>0, percentage of transactions with non-null text, percentage of transactions that age beyond 120 days, average transaction magnitude and standard deviation of transaction magnitude can be applied to identify R-tag/aged transactions from the feature values. Further metrics that can be used can include but are not limited to, decertification record, transaction magnitude z-scores, deviations from credit/debit for the entity, and deviations from null text field for the entity. Within the amount anomalies, the notable features can include but are not limited to, very high amounts compared to past transactions for the previous month, 3 months, and 6 months. In addition, textual models can be employed to analyze the text of the transactions i.e., non-null textual content. The textual content of the transaction can be tokenized to remove dates and special characters split by spaces and Term Frequency-Inverse Document Frequency (TF-IDF) can be used to identify tokens that are disproportionately likely to be associated with R-tags, L-tags, or aged transactions. For example, the original text: '06/23/2016 Billing Receiv-OIM' can be tokenized to produce tokens 'DATE', 'billing', 'receiv', 'oim' from which those that are disproportionately likely to be associated with R Tags, L Tags, or aged items are identified. The R-tag score and the aging score are obtained for the transaction is output at 710. At 712, the R-tag score and the aging score are used to determine if the transaction is likely to be an R-tagged or an aging transaction.

Figure 7B:
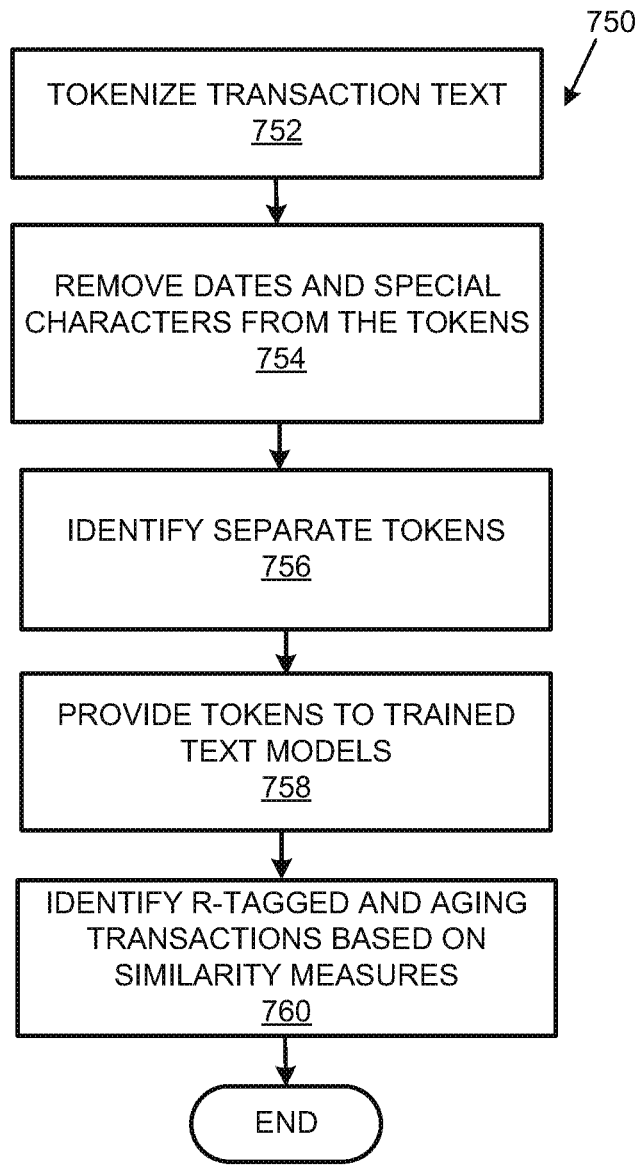
FIG. 7B shows a flowchart that details a method of training text models for using the transaction text to predict R-tag or aging transactions in accordance with the examples disclosed herein.

FIG. 7B shows a flowchart 750 that details a method of training text models for using the transaction text to predict R-tag or aging transactions in accordance with the examples disclosed herein. At 752, the transaction text is tokenized. At 754, the dates, and special characters can be removed from the text tokens. At 756 separate text tokens can be identified based on the spaces in the transaction text. At 758, the tokens are provided to the text models trained for identifying specific targets for particular document types including but not limited to ZA (accruals), SA (standard general ledger account documents), etc. The specific targets for which models are trained can include R-tag transactions, high aging transactions, or open transactions which are not likely to be reconciled for any reason. Techniques wherein TF-IDF can be used in conjunction with a random forest decision tree ensemble to determine the tokens which can be disproportionately associated with the targets. The training data for the current reconciliation period P can include transactions associated with R-tags manually or aging and opens transactions that were manually processed in the P-2 reconciliation periods. Each time the reconciliation (automatic and manual) is completed, the training data is updated. At 760, the trained text models identify tokens that are predominantly associated with previously-identified R-tagged or associated with prior aging transactions in historical data 172 (i.e., P-2 transactional data). The text models can employ different similarity measures such as Cosine similarity, fractional variance, etc. to recognize similarities between current transaction text and the transaction text of prior transactions. In order to obtain cosine similarity, the monthly transactions can be treated as vector amounts. A similarity metric can be defined between adjacent months of transactions.

For amount i, j: the similarity between two transactions can be obtained as:

$$\frac{\sum_{i=j} N_i * N_j}{\sqrt{\left(\sum_i N_i * N_i\right) * \left(\sum_j N_j * N_j\right)}}$$

where $N_i$ and $N_j$ are the number of transactions for amounts i,j in adjacent months. The output will be 1 if the transactions are the same and the output is 0 if the transactions are different.

Another method to compute the similarity between transactions of different months includes fractional variance wherein at account+company code level, the ratio of the variance of current transaction to the historical variance of previous transactions in period is computed. For example, for the ith transaction, the fractional variance compared to prior transactions is obtained as:

$$\frac{|Trx_i|}{|\text{Mean}[Trx_{prev}]|} * \frac{|Trx_i - \text{Mean}[Trx_{prev}]|^2}{\text{Var}[Trx_{prev}]}$$

Figure 8:
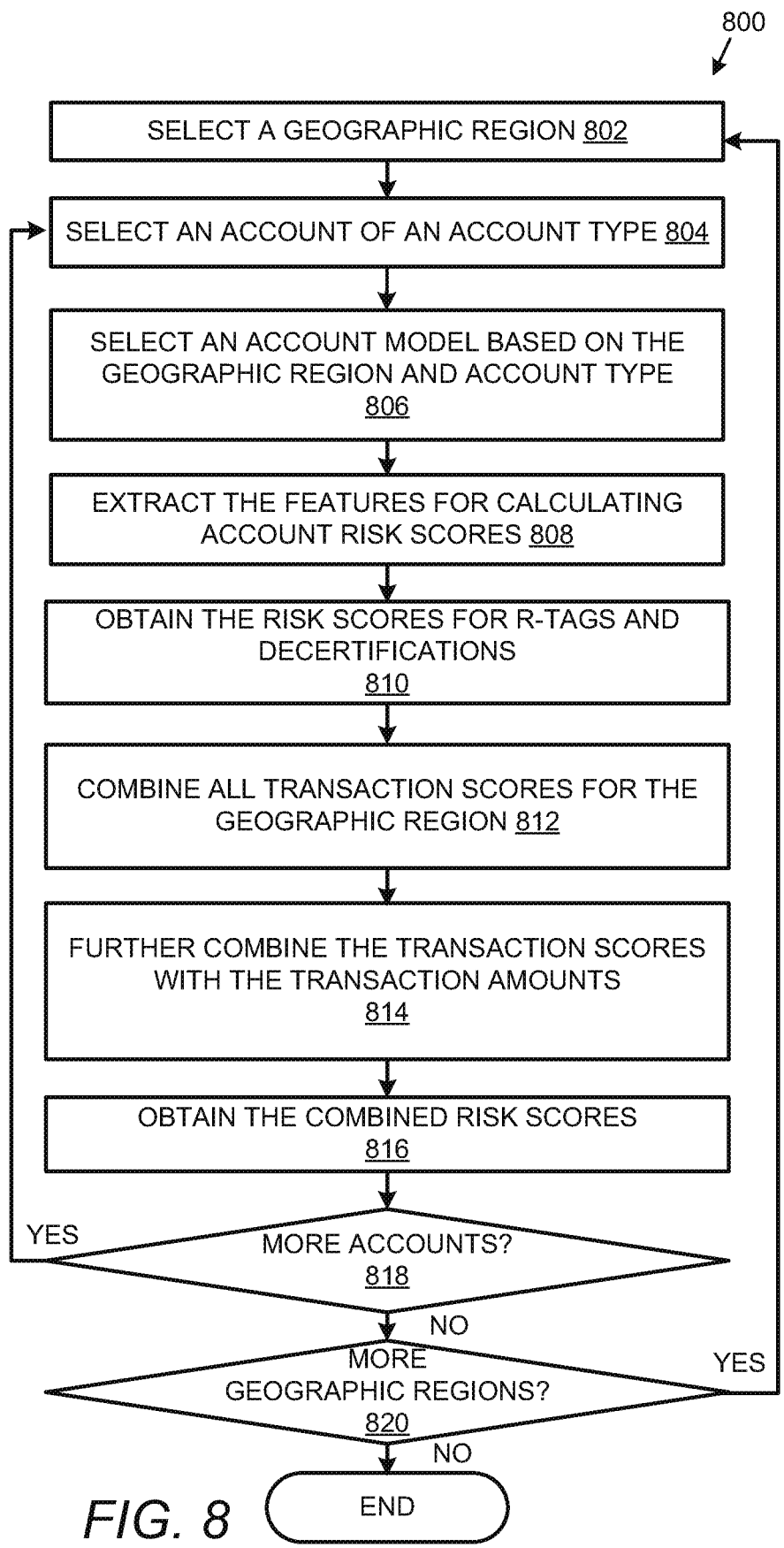
FIG. 8 shows a flowchart that details a method of obtaining the combined risk scores in accordance with the examples disclosed herein.

FIG. 8 shows a flowchart 800 that details a method of obtaining the combined risk scores in accordance with the examples disclosed herein. The method begins at 802 wherein a geographic region is selected for transaction and account data analysis. At 804, an account is selected for obtaining the combined risk score. The selected account can be of different account types and at 806, the account model is selected from the plurality of account models 302 based on the geographic region and the account type. At 808, the features for the selected account model can be extracted from the transaction data 150 associated with the account and the geographic region being processed. In an example, the features for obtaining the account scores can be obtained from R-tag history, decertification history, reconciliation history, anomaly balances, etc. Additional account data can also be selected from one or more of the historical data 172 and the data storage 170.

At 810, the account risk scores for R-tags and de-certifications for the geographic region are obtained from the account model. At 812, the R-tag risk scores, anomaly risk scores, and the aging risk scores for all the transactions for the account are combined. At 814, the risk scores of all the transactions are further combined with the currency values of the transactions. The combined risk score of the account is obtained at 816 by weighing the combination obtained at 814 with the account risk score which is obtained by aggregating (e.g., summing) the account R-tag risk score with the decertification risk score.

At 818, it is determined if more accounts need to be processed for the determination of combined risk scores 142. If yes, the method returns to 804 to select the next account. If no further accounts remain for processing in the selected geographic regions, the method proceeds to 820 to determine if further geographic regions remain for assessment. If yes, the method returns to select the next geographic region at 802. If no further geographic regions remain in the account, the method terminates on the end block.

Figure 9B:
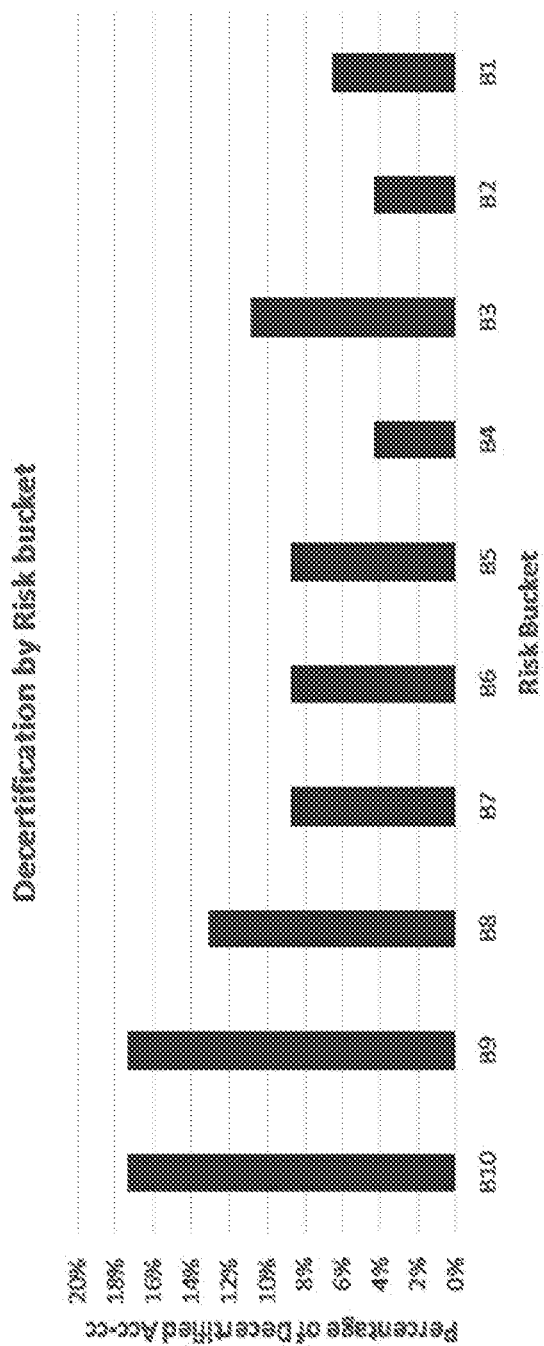

FIGS. 9A and 9B illustrate the applications of the AI-based transaction data processing and reconciliation system 100 in the de-certifications of accounts in accordance with the examples disclosed herein. Accounts decertification occurs primarily due to human errors. The bar graph 910 shows the dates of decertification versus the percentage of accounts decertified. It may be noted from the bar graph 910 that account de-certifications occur at the end of the month (e.g., between the $25^{th}$-$27^{th}$) since employees reconciling the accounts are in a hurry to close the reconciliation for that month. Usage of the AI-based transaction data processing and reconciliation system 100 revealed such inconsistencies in account reconciliation and decertification. Similarly, the bar graph 920 shows the various balance sheet categories or accounts versus the percentage of decertifications. The bar graph 920 may represent the work list 182 which includes accounts arranged in descending order of risk scores. Based on the bar graph 920, the work list 182 can include an order of accounts starting with current receivables, followed in order by other current liabilities, accounts payable, principally trade accounts, nan, all other assets, all other liabilities, and progress collections. Accordingly, the current receivables account with the highest risk of decertification has the highest priority in the reconciliation process followed by the other accounts in the order given in the work list. Similarly, FIG. 9B shows a bar graph of the accounts differentiated based on different risk buckets of decertification versus the percentage of decertification. The risk buckets can include but are not limited to, L-tags, R-tags, aging, anomalies, etc. As the risk bucket B10 has the highest risk, accounts in this risk bucket are prioritized during the decertification process.

Figure 10:
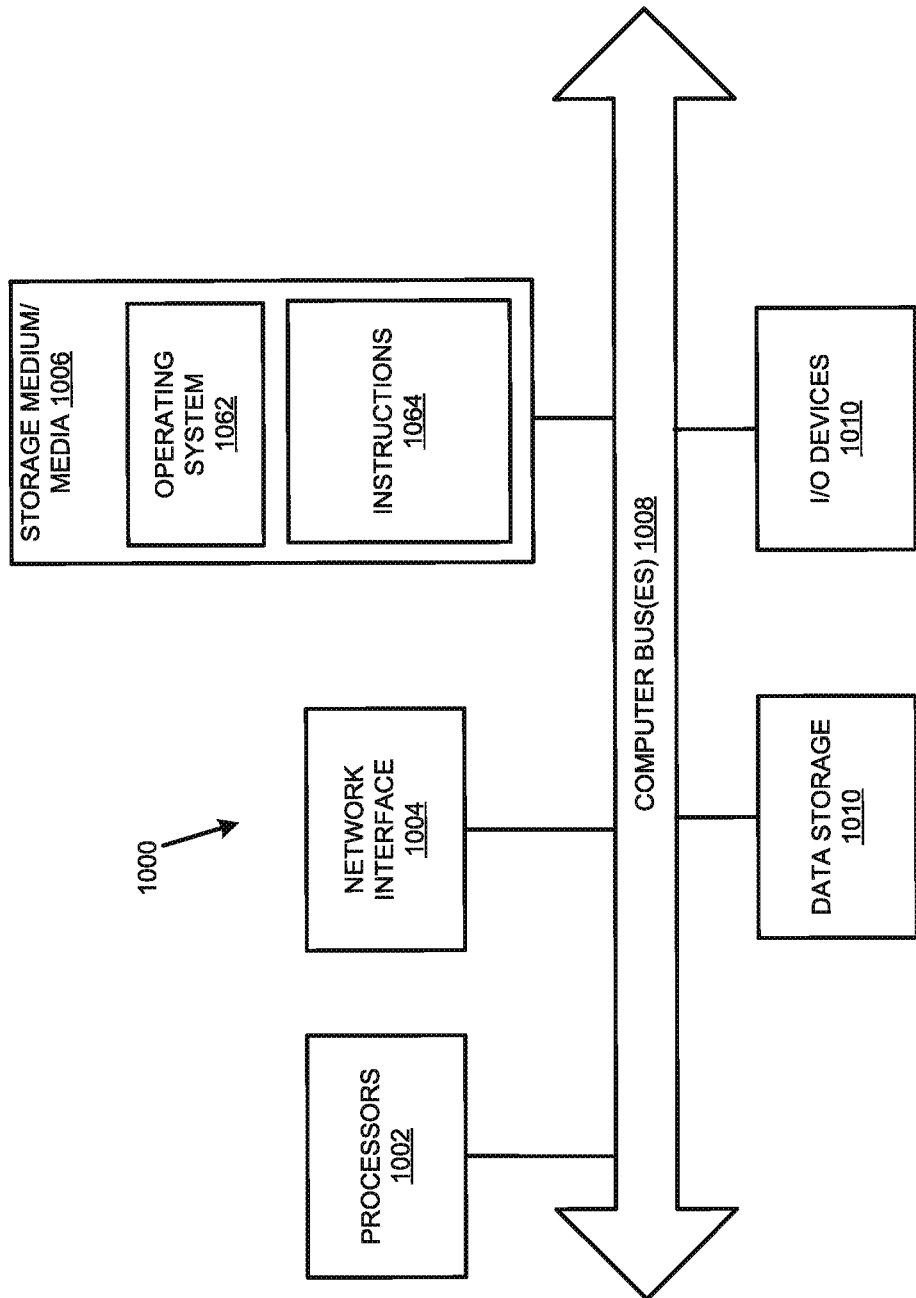
FIG. 10 illustrates a computer system that may be used to implement the AI-based transaction data processing and reconciliation system in accordance with the examples disclosed herein.

FIG. 10 illustrates a computer system 1000 that may be used to implement the AI-based transaction data processing and reconciliation system 100 in accordance with the examples disclosed herein. More particularly, computing machines such as desktops, laptops, smartphones, tablets, and wearables which may be used to generate or access the data from the AI-based transaction data processing and reconciliation system 100 may have the structure of the computer system 1000. The computer system 1000 may include additional components not shown and that some of the process components described may be removed and/or modified. In another example, a computer system 1000 can sit on external-cloud platforms such as Amazon Web Services, AZURE® cloud or internal corporate cloud computing clusters, or organizational computing resources, etc.

The computer system 1000 includes processor(s) 1002, such as a central processing unit, ASIC or another type of processing circuit, input/output devices 1010, such as a display, mouse keyboard, etc., a network interface 1004, such as a Local Area Network (LAN), a wireless 802.11x LAN, a 3G, 4G or 10G mobile WAN or a WiMax WAN, and a processor-readable medium 1006. Each of these components may be operatively coupled to a bus 1008. The processor-readable or computer-readable medium 1006 may be any suitable medium that participates in providing instructions to the processor(s) 1002 for execution. For example, the processor-readable medium 1006 may be a non-transitory or non-volatile medium, such as a magnetic disk or solid-state non-volatile memory, or a volatile medium such as RAM. The instructions or modules stored on the processor-readable medium 1006 may include machine-readable instructions 1064 executed by the processor(s) 1002 that cause the processor(s) 1002 to perform the methods and functions of the AI-based transaction data processing and reconciliation system 100.

The AI-based transaction data processing and reconciliation system 100 may be implemented as software or machine-readable instructions stored on a non-transitory processor-readable medium and executed by one or more processors 1002. For example, the processor-readable medium 1006 may store an operating system 1010, such as MAC OS, MS WINDOWS, UNIX, or LINUX, and code 1014 for the AI-based transaction data processing and reconciliation system 100. The operating system 1062 may be multi-user, multiprocessing, multitasking, multithreading, real-time, and the like. For example, during runtime, the operating system 1010 is running and the code for the AI-based transaction data processing and reconciliation system 100 is executed by the processor(s) 1002.

The computer system 1000 may include a data storage 1010, which may include non-volatile data storage. The data storage 1010 stores any data used by the AI-based data reconciliation system. The data storage 1010 may be used as the data storage 170 to store the transaction data 150, including the transactions 152 and accounts 154, predicted values, and other data elements which are generated and/or used during the operation of the AI-based data reconciliation system.

The network interface 1004 connects the computer system 1000 to internal systems for example, via a LAN. Also, the network interface 1004 may connect the computer system 1000 to the Internet. For example, the computer system 1000 may connect to web browsers and other external applications and systems via the network interface 1004.

What has been described and illustrated herein is an example along with some of its variations. The terms, descriptions, and figures used herein are set forth by way of illustration only and are not meant as limitations. Many variations are possible within the spirit and scope of the subject matter, which is intended to be defined by the following claims and their equivalents.

What is claimed is:

1. A method of processing and validating documents comprising:

training a plurality of anomaly detection models, a plurality of tag prediction models, and a plurality of aging prediction models on training data including prior transaction reconciliation data, wherein each anomaly detection model of the plurality of anomaly detection models is trained to identify anomalous transactions from transaction data associated with a corresponding geographic region, wherein the training of the plurality of anomaly detection models comprising:

obtaining feature of the transaction data includes transaction amount profiles, transaction user profiles, transaction currency profiles, and transaction text profiles, extracting values from the feature of the transaction data for calculation of an anomaly score for each of the transactions in the transaction data, applying a cluster-based local outlier factor model to identify transactions having atypical values that is different than the extracted values from the feature of the transaction data, wherein the atypical values are flagged as anomalies in the transaction data;

wherein each tag prediction model of the plurality of tag prediction models is trained to predict tagged transactions from the transaction data associated with the corresponding geographic region, wherein the training of the plurality of tag prediction models comprises:

obtaining feature of the transaction data includes risk tables, amount anomalies, and text models;

extracting values from the feature of the transaction data; and generating a required adjustments tag (R-tag) risk score for each of the transactions in the transaction data to predict the transactions that are associated with R-tags;

wherein each aging prediction model of the plurality of aging prediction models is trained to predict aging transactions from the transaction data associated with the corresponding geographic region, and wherein the training of the plurality of aging prediction models comprises:

obtaining feature of the transaction data includes risk table features, amount anomalies and textual features;

extracting values from the feature of the transaction data; and generating an aging risk score for each of the transactions in the transaction data that indicates a transaction age for a predetermined period;

accessing transaction data of a plurality of transactions associated with a plurality of accounts, the plurality of transactions correspond to different regions and the plurality of transactions occur in a predetermined time period;

determining one or more anomalous transactions included m the transaction data corresponding to the different regions, wherein the one or more anomalous transactions are determined by at least one of the plurality of anomaly detection models;

obtaining predictions for one or more tagged transactions and aging transactions included in the transaction data corresponding to the different regions, wherein the predictions for the one or more tagged transactions and aging transactions are generated correspondingly by at least one of the plurality of tag prediction models and the plurality of aging prediction models;

determining a combined risk score for each account of the plurality of accounts based at least on a number of the anomalous transactions, tagged transactions, and aging transactions associated with the account in the transaction data corresponding to a geographic region; and creating a work list for the geographic region, wherein the work list includes the plurality of accounts in a ranked order of the combined risk scores, wherein each account further includes transactions associated with the account from the transaction data of different regions, wherein the transactions associated with the account are arranged in the account in a descending order of transaction risk scores; and enabling automatic reconciliation of the transactions included in the plurality of accounts in the work list having the combined risk scores below a predetermined threshold.

2. The method of claim 1, further comprising:
receiving feedback regarding the automatic reconciliation of the transactions, wherein the feedback includes changes to actions executed during the automatic reconciliation of the transactions; and
further training the plurality of anomaly detection models, the plurality of tag prediction models, and the plurality of aging prediction models on the feedback.

3. The method of claim 1, wherein determining the combined score further comprises:
obtaining a product of log of absolute transaction amount with transaction score and account score for each transaction, and
summing the products for all transactions in the transaction data of different regions.

4. The method of claim 1, wherein each of the plurality of tag prediction models and each of the plurality of aging prediction models includes a random forest ensemble of decision trees.

5. A non-transitory processor-readable storage medium comprising machine-readable instructions that cause a processor to:
train a plurality of anomaly detection models, a plurality of tag prediction models, and a plurality of aging prediction models on training data including prior transaction reconciliation data,
wherein each anomaly detection model of the plurality of anomaly detection models is trained to identify anomalous transactions from transaction data associated with a corresponding geographic region, wherein the training of the plurality of anomaly detection models comprises:
obtaining feature of the transaction data includes transaction amount profiles, transaction user profiles, transaction currency profiles, and transaction text profiles;
extracting values from the feature of the transaction data for calculation of an anomaly score for each of the transactions in the transaction data; and
applying a cluster-based local outlier factor model to identify transactions having atypical values that is different than the extracted values from the feature of the transaction data, wherein the atypical values are flagged as anomalies in the transaction data;
wherein each tag prediction model of the plurality of tag prediction models is trained to predict tagged transactions from the transaction data associated with the corresponding geographic region, wherein the training of the plurality of tag prediction models comprises:
obtaining feature of the transaction data includes risk tables, amount anomalies, and text models;
extracting values from the feature of the transaction data; and
generating a required adjustments tag (R-tag) risk score for each of the transactions in the transaction data to predict the transactions that are associated with R-tags;
wherein each aging prediction model of the plurality of aging prediction models is trained to predict aging transactions from the transaction data associated with the corresponding geographic region, wherein the training of the plurality of aging prediction models comprises:
obtaining feature of the transaction data includes risk table features, amount anomalies and textual features;
extracting values from the feature of the transaction data; and
generating an aging risk score for each of the transactions in the transaction data that indicates a transaction age for a predetermined period;
access transaction data of a plurality of transactions associated with a plurality of accounts, the plurality of transactions correspond to different regions and the plurality of transactions occur in a predetermined time period;
determine one or more anomalous transactions included m the transaction data corresponding to the different regions,
wherein the one or more anomalous transactions are determined by at least one of the plurality of anomaly detection models;
obtain predictions for one or more tagged transactions and aging transactions included in the transaction data corresponding to the different regions,
wherein the predictions for the one or more tagged transactions and aging transactions are generated correspondingly by at least one of the plurality of tag prediction models and the plurality of aging prediction models;
determine a combined risk score for each account of the plurality of accounts based at least on a number of the anomalous transactions, tag transactions, and aging transactions associated with the account in the transaction data corresponding to different regions;

create a work list including the plurality of accounts in a ranked order of the combined risk scores,
  wherein each account further includes transactions associated with the account from the transaction data of different regions,
  wherein the transactions associated with the account are arranged in the account in a descending order of transaction risk scores; and enable automatic reconciliation of the transactions included in the plurality of accounts in the work list having the combined risk scores below a predetermined threshold.

6. The non-transitory processor-readable storage medium of claim 5, further causing the processor to:
generate account risk scores for each of the plurality of accounts,
  wherein the account risk scores provide predictions for each of the plurality of accounts to include tag transactions and to be decertificd.

7. The method of claim 1, wherein to predict the R-tag or the aging transactions based on a training of the text model for a transaction text, wherein the training of the text model includes:
tokenizing the transaction text;
removing dates and special characters from text tokens;
identifying separate text tokens based on spaces in the transaction text;
providing the tokens to train the text model; and
identifying tokens that are associated with previously-identified R-tag or associated with prior aging transactions in historical data.

8. The method of claim 7, wherein the text models employ different similarity measures to recognize similarities between current transaction text and the transaction text of prior transactions.

9. The method of claim 1, further comprises:
generating account risk scores for each of the plurality of accounts,
  wherein the account risk scores provide predictions for each of the plurality of accounts to include tag transactions and to be decertified.

10. The non-transitory processor-readable storage medium of claim 6, further causing the processor to comprise:
receive feedback regarding the automatic reconciliation of the transactions, wherein the feedback includes changes to actions executed during the automatic reconciliation of the transactions; and
further train the plurality of anomaly detection models, the plurality of tag prediction models, and the plurality of aging prediction models on the feedback.

11. The non-transitory processor-readable storage medium of claim 6, wherein causing the processor to determine the combined score further comprises:
obtain a product of log of absolute transaction amount with transaction score and account score for each transaction, and
sum the products for all transactions in the transaction data of different regions.

12. The non-transitory processor-readable storage medium of claim 6, wherein each of the plurality of tag prediction models and each of the plurality of aging prediction models includes a random forest ensemble of decision trees.

13. The non-transitory processor-readable storage medium of claim 6, wherein causing the processor to predict the R-tag or the aging transactions based on a training of the text model for a transaction text, wherein the training of the text model includes:
tokenizing the transaction text;
removing dates and special characters from text tokens;
identifying separate text tokens based on spaces in the transaction text;
providing the tokens to train the text model; and
identifying tokens that are associated with previously-identified R-tag or associated with prior aging transactions in historical data.

14. A system for processing and validating documents comprising:
at least one processor;
a non-transitory processor-readable medium storing machine-readable instructions that cause the processor to:
train a plurality of anomaly detection models, a plurality of tag prediction models, and a plurality of aging prediction models on training data including prior transaction reconciliation data,
  wherein each anomaly detection model of the plurality of anomaly detection models is trained to identify anomalous transactions from transaction data associated with a corresponding geographic region, wherein the training of the plurality of anomaly detection models comprising:
    obtaining feature of the transaction data includes transaction amount profiles, transaction user profiles, transaction currency profiles, and transaction text profiles,
    extracting values from the feature of the transaction data for calculation of an anomaly score for each of the transactions in the transaction data,
    applying a cluster-based local outlier factor model to identify transactions having atypical values that is different than the extracted values from the feature of the transaction data,
  wherein the atypical values are flagged as anomalies in the transaction data;
  wherein each tag prediction model of the plurality of tag prediction models is trained to predict tagged transactions from the transaction data associated with the corresponding geographic region, wherein the training of plurality of tag prediction models comprising:
    obtaining feature of the transaction data includes risk tables, amount anomalies, and text models,
    extracting values from the feature of the transaction data;
    generating a required adjustments tag (R-tag) risk score for each of the transactions in the transaction data to predict the transactions that are associated with R-tags;
  wherein each aging prediction model of the plurality of aging prediction models is trained to predict aging transactions from the transaction data associated with the corresponding geographic region;
  wherein the training of plurality of aging prediction models comprising:
    obtaining feature of the transaction data includes risk table features, amount anomalies and textual features,
    extracting values from the feature of the transaction data, generating an aging risk score for each of the transactions in the transaction data that indicates a transaction age for a predetermined period;

access transaction data of a plurality of transactions associated with a plurality of accounts, the plurality of transactions correspond to different regions and the plurality of transactions occur in a predetermined time period;

determine one or more anomalous transactions included in the transaction data corresponding to the different regions,
   wherein the one or more anomalous transactions are determined by at least one of the plurality of anomaly detection models;

obtain predictions for one or more tagged transactions and aging transactions included in the transaction data corresponding to the different regions,
   wherein the predictions for the one or more tagged transactions and aging transactions are generated correspondingly by at least one of the plurality of tag prediction models and the plurality of aging prediction models;

determine a combined risk score for each account of the plurality of accounts based at least on a number of the anomalous transactions, tag transactions, and aging transactions associated with the account in the transaction data corresponding to different regions;

create a work list including the plurality of accounts in a ranked order of the combined risk scores,
   wherein each account further includes transactions associated with the account from the transaction data of different regions,
   wherein the transactions associated with the account are arranged in the account in a descending order of transaction risk scores; and enable automatic reconciliation of the transactions included in the plurality of accounts in the work list having the combined risk scores below a predetermined threshold.

15. The system for processing and validating documents of claim 14, the processor is to further comprise:
receive feedback regarding the automatic reconciliation of the transactions, wherein the feedback includes changes to actions executed during the automatic reconciliation of the transactions; and
further train the plurality of anomaly detection models, the plurality of tag prediction models, and the plurality of aging prediction models on the feedback.

16. The system for processing and validating documents of claim 14, wherein to determine the combined score the processor is further comprise:
obtain a product of log of absolute transaction amount with transaction score and account score for each transaction, and
sum the products for all transactions in the transaction data of different regions.

17. The system for processing and validating documents of claim 14, wherein each of the plurality of tag prediction models and each of the plurality of aging prediction models includes a random forest ensemble of decision trees.

18. The system for processing and validating documents of claim 14, wherein to predict the R-tag or the aging transactions based on a training of the text model for a transaction text, wherein the training of the text model, the processor is to further:
tokenize the transaction text;
remove dates and special characters from text tokens;
identify separate tokens based on spaces in the transaction text;
provide the tokens to train the text models; and
identifying tokens that are associated with previously-identified R-tag or associated with prior aging transactions in historical data.

19. The system for processing and validating documents of claim 18, wherein to predict the R-tag or the aging transactions based on a training of the text model for a transaction text, wherein the training of the text model, the processor is to further:
employ different similarity measures to recognize similarities between current transaction text and the transaction text of prior transactions.

20. The system for processing and validating documents of claim 14, wherein the processor is to further:
generate account risk scores for each of the plurality of accounts,
   wherein the account risk scores provide predictions for each of the plurality of accounts to include tag transactions and to be decertified.

* * * * *